United States Patent
Mathieu

(10) Patent No.: US 8,416,334 B2
(45) Date of Patent: Apr. 9, 2013

(54) THICK SINGLE-LENS EXTENDED DEPTH-OF-FIELD IMAGING SYSTEMS

(75) Inventor: Gilles Mathieu, Kennedy Town (HK)

(73) Assignee: FM-Assets Pty Ltd., Sydney (AU)

( * ) Notice: Subject to any disclaimer, the term of this patent is extended or adjusted under 35 U.S.C. 154(b) by 423 days.

(21) Appl. No.: 12/799,537

(22) Filed: Apr. 27, 2010

(65) Prior Publication Data

US 2011/0261247 A1 Oct. 27, 2011

(51) Int. Cl.
*G02B 13/16* (2006.01)
*H04N 5/225* (2006.01)

(52) U.S. Cl. ........................................................ 348/335

(58) Field of Classification Search .................. 348/335
See application file for complete search history.

(56) References Cited

U.S. PATENT DOCUMENTS

| | | |
|---|---|---|
| 4,124,276 A | 11/1978 | Okano |
| 4,898,461 A | 2/1990 | Portney |
| 5,748,371 A | 5/1998 | Cathey et al. |
| 6,842,297 B2 | 1/2005 | Dowski |
| 6,911,638 B2 | 6/2005 | Dowski |
| 6,927,922 B2 | 8/2005 | George et al. |
| 6,940,649 B2 | 9/2005 | Dowsky |
| 7,106,510 B2 | 9/2006 | Dowski |
| 7,180,673 B2 | 2/2007 | Dowski |
| 7,215,493 B2 | 5/2007 | Olmstead et al. |
| 7,218,448 B1 | 5/2007 | Cathey et al. |
| 7,224,540 B2 | 5/2007 | Olmstead et al. |
| 7,260,251 B2 | 8/2007 | Dowsky |
| 7,336,430 B2 | 2/2008 | George et al. |
| 7,469,202 B2 | 12/2008 | Dowsky et al. |
| 7,646,549 B2 | 1/2010 | Zalevski et al. |
| 2006/0034003 A1 | 2/2006 | Zalevski |
| 2006/0050410 A1 | 3/2006 | Zeng et al. |
| 2007/0247725 A1 | 10/2007 | Dowsky |
| 2008/0044103 A1 | 2/2008 | Dowski et al. |
| 2008/0151391 A1 | 6/2008 | Zalevski et al. |
| 2010/0110275 A1* | 5/2010 | Mathieu .................. 348/360 |
| 2010/0328517 A1* | 12/2010 | Mathieu .................. 348/340 |
| 2011/0115965 A1 | 5/2011 | Engelhardt et al. |
| 2011/8014804 | 9/2011 | Alon et al. |

FOREIGN PATENT DOCUMENTS

| | | |
|---|---|---|
| EP | 1978394 A1 | 1/2008 |
| JP | 2002/341241 | 11/2002 |
| WO | WO 2009/106996 | 9/2009 |

OTHER PUBLICATIONS

Mouroulis, "Depth of field extension with spherical optics," Optics Express, vol. 16, No. 17, Aug. 18, 2008 (pp. 12995-13004).
Liu et al, "Cemented doublet lens with an extended focal depth," Optics Express, Vo. 13, No. 2, Jan. 24, 2005 (pp. 552-557).

* cited by examiner

*Primary Examiner* — Anthony J Daniels
(74) *Attorney, Agent, or Firm* — Opticus IP Law, PLLC

(57) ABSTRACT

An extended depth of field (EDOF) imaging system (10) is disclosed that has an optical system (20) consisting of a single lens element (22) having a focal length (F), a thickness (TH) between 0.25F and 1.2F, and an objectwise aperture stop (AS). The optical system has a select amount of spherical aberration (SA) that allows for correcting coma by positioning the aperture stop. The optical system has an amount of field curvature (FC) such that 20 microns $\leq$ FC $\leq$ 300 microns, which is made possible by the thickness of the single lens element. The imaging system has an image sensor (30) and an image processing unit (54) adapted to process raw images to form contrast-enhanced images.

20 Claims, 14 Drawing Sheets

Field 0 mm

Field 1 mm

Field 2 mm

Field 3 mm

THICK SINGLE-LENS EXTENDED DEPTH-OF-FIELD IMAGING SYSTEMS

BACKGROUND ART

1. Field of the Disclosure

The present disclosure relates generally to extended depth-of-field imaging systems, and particularly relates to such a system that utilizes a relatively thick single lens element in the imaging optical system.

2. Technical Background

Extended depth-of-field ("EDOF") imaging systems (also referred to as "extended depth-of-focus" imaging systems) have seen increased use in various applications such as biometrics (e.g., iris recognition), bar-code scanners and closed-circuit television (CCTV) systems.

The optical systems of EDOF imaging systems typically include either more than one lens element or include a non-circularly symmetric "wavefront coding" plate arranged in the entrance pupil to impart a complex wavefront shape.

Since EDOF imaging systems are desirable for use in an increasingly greater number of imaging applications that call for small form factors (e.g., cell phones and other hand-held image-capturing devices), there is a need for EDOF imaging systems that are extremely simple and compact but that can still provide EDOF imaging capability with good aberration correction.

SUMMARY OF THE DISCLOSURE

The present disclosure is directed to an extended depth-of-focus (EDOF) imaging system that has an optical system consisting of only one relatively thick lens element and an aperture stop located between front surface of the lens and the object. The lens element is configured so that the optical system has substantially constant spherical aberration over the entire image field while having substantially no coma or astigmatism, reduced field curvature from prior art single-lens designs, and perhaps some chromatic aberration, depending on the spectral bandwidth used to form the image. The single-lens configuration makes for a very compact and simple EDOF imaging system useful for a wide range of imaging applications.

It is to be understood that both the foregoing general description and the following detailed description present embodiments of the disclosure, and are intended to provide an overview or framework for understanding the nature and character of the disclosure as it is claimed. The accompanying drawings are included to provide a further understanding of the disclosure, and are incorporated into and constitute a part of this specification. The drawings illustrate various embodiments of the disclosure and together with the description serve to explain the principles and operations of the disclosure.

DETAILED DESCRIPTION

Figure 1:
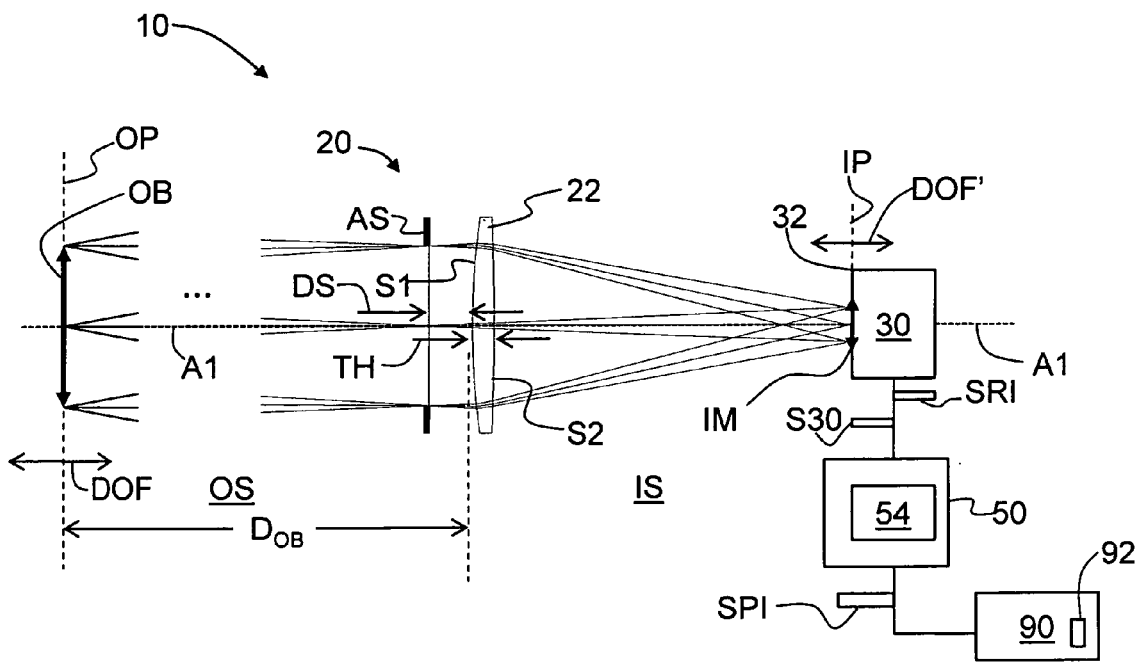
FIG. 1 is a schematic diagram of an example embodiment of a single-lens EDOF imaging system according to the present disclosure.

Reference is now made in detail to the present preferred embodiments of the disclosure, examples of which are illustrated in the accompanying drawings. Whenever possible, like or similar reference numerals are used throughout the drawings to refer to like or similar parts. Various modifications and alterations may be made to the following examples within the scope of the present disclosure, and aspects of the different examples may be mixed in different ways to achieve yet further examples. Accordingly, the true scope of the disclosure is to be understood from the entirety of the present disclosure, in view of but not limited to the embodiments described herein.

The present disclosure is directed to relatively thick single-lens EDOF imaging systems that cover a wide range of focal lengths and that have good correction of field curvature. Potential applications include compact imaging systems such as mobile image capture devices (e.g., cell phone cameras), iris recognition systems, facial image capture for facial recognition systems, CCTV systems, and the like. PCT Patent Application PCT/IB2008/001304, filed on Feb. 29, 2008, is incorporated herein by reference.

The term "lens element" as used herein is defined as a single, rotationally symmetric optical component made of a single optical material, and does not include so-called "phase plates" or "phase-encoding" elements that typically reside in the entrance pupil of an optical system and that are not rotationally symmetric.

The phrase "extended depth-of-field" as used herein means a depth-of-field that is larger than what is normally associated with the corresponding diffraction-limited optical system. The phrase "extended depth-of-focus" is similarly defined.

The phrase "contrast-enhanced image" means an image having improved contrast as compared to the contrast of an initial or "raw" image formed by the optical system.

Unless otherwise noted, the values of F/# and numerical aperture (NA) are for the image space.

A generalized single-lens EDOF optical imaging system is first discussed, followed by example embodiments of single-lens imaging optical systems for use in the generalized EDOF imaging system.

Generalized EDOF System

FIG. 1 is a schematic diagram of a generalized embodiment of a generalized single-lens EDOF optical system ("system") 10 according to the present disclosure. System 10 includes an optical axis A1 along which is arranged an imaging optical system 20 that consists of a single lens element 22 and an aperture stop AS located objectwise of the lens element at an axial distance DS from an objectwise front lens surface S1. Aperture stop AS is "clear" or "open," meaning that it does not include any phase-altering elements, such as phase plates, phase-encoding optical elements or other types of phase-altering means.

Optical system 20 has a lateral magnification $M_L$, an axial magnification $M_A = (M_L)^2$, an object plane OP in an object space OS and an image plane IP in an image space IS. An object OB is shown in object plane OP and the corresponding image IM formed by optical system 20 is shown in image plane IP. Object OB is at an axial object distance $D_{OB}$ from lens element 22.

Optical system 20 has a depth of field DOF in object space OS over which the object can be imaged and remain in focus. Likewise, optical system 20 has a corresponding depth of focus DOF' in image space IS over which image IM of object OB remains in focus. Object and image planes OS and IS are thus idealizations of the respective positions of object OB and the corresponding image IM and typically correspond to an optimum object position and a "best focus" position, respectively. In actuality, these planes can actually fall anywhere within their respective depth of field DOF and depth of focus DOF', and are typically curved rather than planar. The depth of field DOF and depth of focus DOF' are defined by the properties of optical system 20, and their interrelationship and importance in system 10 is discussed more fully below.

System 10 also includes an image sensor 30 that has a photosensitive surface 32 (e.g., an array of charge-coupled devices) arranged at image plane IP so as receive and detect image IM, which is also referred to herein as an "initial" or a "raw" image. In an example embodiment, image sensor 30 is or otherwise includes a high-definition CCD camera or CMOS camera. In an example embodiment, photosensitive surface 32 is made up of 3000×2208 pixels, with a pixel size of 3.5 microns. The full-well capacity is reduced to 21,000 electrons for a CMOS camera at this small pixel size, which translates into a minimum of shot noise of 43.2 dB at saturation level. An example image sensor 30 is or includes a camera from Pixelink PL-A781 having 3000×2208 pixels linked by IEEE1394 Fire Wire to an image processor (discussed below), and the application calls API provided by a Pixelink library in a DLL to control the camera perform image acquisition. An example image sensor 30 has about a 6 mm diagonal measurement of photosensitive surface 32.

In an example embodiment, system 10 further includes a controller 50, such as a computer or like machine, that is adapted (e.g., via instructions such as software embodied in a computer-readable or machine-readable medium) to control the operation of the various components of the system. Controller 50 is configured to control the operation of system 10 and includes an image processing unit ("image processor") 54 electrically connected to image sensor 30 and adapted to receive and process digitized raw image signals SRI therefrom and form processed image signals SPI, as described in greater detail below.

Figure 2:
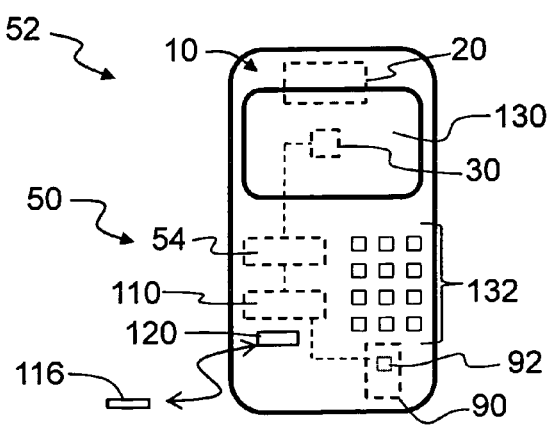
FIG. 2 is a schematic diagram of an example hand-held device that includes the EDOF imaging system of FIG. 1, and illustrates an example controller.

FIG. 2 is a schematic diagram of an example hand-held device 52 that includes system 10, and illustrates an example controller 50. In an example embodiment, controller 50 is or includes a computer with a processor (e.g., image processor 54) and includes an operating system such as Microsoft WINDOWS or LINUX.

In an example embodiment, image processor 54 is or includes any processor or device capable of executing a series of software instructions and includes, without limitation, a general- or special-purpose microprocessor, finite state machine, controller, computer, central-processing unit (CPU), field-programmable gate array (FPGA), or digital signal processor. In an example embodiment, the processor is an Intel XEON or PENTIUM processor, or an AMD TURION or other processor in the line of such processors made by AMD Corp., Intel Corp. or other semiconductor processor manufacturer.

Controller 50 also preferably includes a memory unit ("memory") 110 operably coupled to image processor 54. As used herein, the term "memory" refers to any processor-readable medium, including but not limited to RAM, ROM, EPROM, PROM, EEPROM, disk, floppy disk, hard disk, CD-ROM, DVD, or the like, on which may be stored a series of instructions executable by image processor 54. In an example embodiment, controller 50 includes a port or drive 120 adapted to accommodate a removable processor-readable medium 116, such as CD-ROM, DVE, memory stick or like storage medium.

The EDOF methods of the present disclosure may be implemented in various embodiments in a machine-readable medium (e.g., memory 110) comprising machine readable instructions (e.g., computer programs and/or software modules) for causing controller 50 to perform the methods and the controlling operations for operating system 10. In an example embodiment, the computer programs run on image processor 54 out of memory 110, and may be transferred to main memory from permanent storage via disk drive or port 120 when stored on removable media 116, or via a network connection or modem connection when stored outside of controller 50, or via other types of computer or machine-readable media from which it can be read and utilized.

The computer programs and/or software modules may comprise multiple modules or objects to perform the various methods of the present disclosure, and control the operation and function of the various components in system 10. The type of computer programming languages used for the code may vary between procedural code-type languages to object-oriented languages. The files or objects need not have a one to one correspondence to the modules or method steps described depending on the desires of the programmer. Further, the method and apparatus may comprise combinations of software, hardware and firmware. Firmware can be downloaded into image processor 54 for implementing the various example embodiments of the disclosure.

Controller 50 also optionally includes a display 130 that can be used to display information using a wide variety of alphanumeric and graphical representations. For example, display 130 is useful for displaying enhanced images. Controller 50 also optionally includes a data-entry device 132, such as a keyboard, that allows a user of system 10 to input information into controller 50 (e.g., the name of the object being imaged, and to manually control the operation of system 10. In an example embodiment, controller 50 is made sufficiently compact to fit within a small form-factor housing of a hand-held or portable device, such as device 52 shown in FIG. 2.

System 10 also optionally includes a database unit 90 operably connected to controller 50. Database unit 90 includes a memory unit 92 that serves as a computer-readable medium adapted to receive processed image signals SPI from image processor 54 and store the associated processed digital images of object OB as represented by the processed image signals. Memory unit ("memory") 92 may be any computer-readable medium, including but not limited to RAM, ROM, EPROM, PROM, EEPROM, disk, floppy disk, hard disk, CD-ROM, DVD, or the like, on which data may be stored. In an example embodiment, database unit 90 is included within controller 50.

General Method of Operation

With reference to FIG. 1, in the general operation of system 10, image IM of object OB is formed on photosensitive surface 32 of sensor 30 by optical system 20. Controller 50 sends a control signal S30 to activate image sensor 30 for a given exposure time so that image IM is captured by photosensitive surface 32. Image sensor 30 digitizes this "raw" image IM and creates the electronic raw image signal SRI representative of the raw captured image.

At this point, in one example embodiment, the raw image IM can be used directly, i.e., without any image processing, or with only minor image processing that does not involve MTF-enhancement, as discussed below. This approach can be used for certain types of imaging applications, such as character recognition and for imaging binary objects (e.g., bar-code objects) where, for example, determining edge location is more important than image contrast. The raw image IM is associated with an EDOF provided by optical system 20 even without additional contrast-enhancing image processing, so that in some example embodiments, system 10 need not utilize the image-processing portion of the system. In an example embodiment, a number N of raw images are collected and averaged (e.g., using image processor 54) in order to form a (digitized) raw image IM' that has reduced noise as compared to any one of the N raw images.

In other example embodiments where the raw image IM is not directly usable, image processor 54 receives and digitally processes the electronic raw image signal SRI to form a corresponding contrast-enhanced image embodied in an electronic processed image signal SPI, which is optionally stored in database unit 90. For example, when system 10 is used for iris recognition, controller 50 accesses the stored processed images in database unit 90 and compares them to other stored iris images or to recently obtained processed iris images to perform personnel identification.

Image Processing

Image processor 54 is adapted to receive from image sensor 30 digitized electrical raw image signals SRI and process the corresponding raw images to form processed, contrast-enhanced images. This is accomplished by filtering the raw images in a manner that restores the MTF as a smooth function that decreases continuously with spatial frequency and that preferably avoids overshoots, ringing and other image artifacts.

Noise amplification is often a problem in any filtering process that seeks to sharpen a signal (e.g., enhance contrast in a digital optical image). Accordingly, in an example embodiment, an optimized gain function (similar to Wiener's filter) that takes in account the power spectrum of noise is applied to reduce noise amplification during the contrast-enhancement process.

In an example embodiment, the gain function applied to the "raw" MTF to form the "output" or "enhanced" MTF (referred to hereinbelow as "output MTF'") depends on the object distance $D_{OB}$. The MTF versus distance $D_{OB}$ is acquired by a calibration process wherein the MTF is measured in the expected depth of field DOF by sampling using defocus steps $\lambda_F \leq (\frac{1}{8})(\lambda/(NA^2))$ to avoid any undersampling and thus the loss of through-focus information for the MTF. In this instance, the enhanced MTF is said to be "focus-dependent."

MTF Restoration

The above-mentioned MTF gain function used to restore or enhance the raw MTF is a three-dimensional function G(u, v, d), wherein u is the spatial frequency along the X axis, v is the spatial frequency along the Y axis, and d is the distance of the object in the allowed extended depth of field DOF (d thus corresponds to the object distance $D_{OB}$). The rotational symmetry of the PSF and MTF results in a simplified definition of the gain function, namely:

$$G'(\omega, d) \text{ with } \omega^2 = u^2 + v^2$$

The rotational symmetry also makes G'(ω, d) a real function instead of a complex function in the general case.

The "enhanced" or "restored" OTF is denoted OTF' and is defined as:

$$OTF'(u,v,d) = G(u,v,d)OTF(u,v,d)$$

where OTF is the Optical Transfer Function of the optical system for incoherent light, OTF' is the equivalent OTF of the imaging system including the digital processing, and G is the aforementioned MTF gain function. The relationship for the restored or "output" or "enhanced" MTF (i.e., MTF') based on the original or unrestored MTF is given by:

$$MTF'(\omega, d) = G'(\omega, d) MTF(\omega, d)$$

When the object distance is unknown, an optimized average gain function G' can be used. The resulting MTF is enhanced, but is not a function of the object distance.

The after-digital process is preferably optimized to deliver substantially the same MTF at any distance in the range of the working depth of field DOF. This provides a substantially constant image quality, independent of object distance $D_{OB}$, so long as $D_{OB}$ is within the depth of field DOF of optical system 20. Because optical system 20 has an extended depth of field DOF due to the presence of spherical aberration as described below, system 10 can accommodate a relatively large variation in object distance $D_{OB}$ and still be able to capture suitable images.

Figure 3:
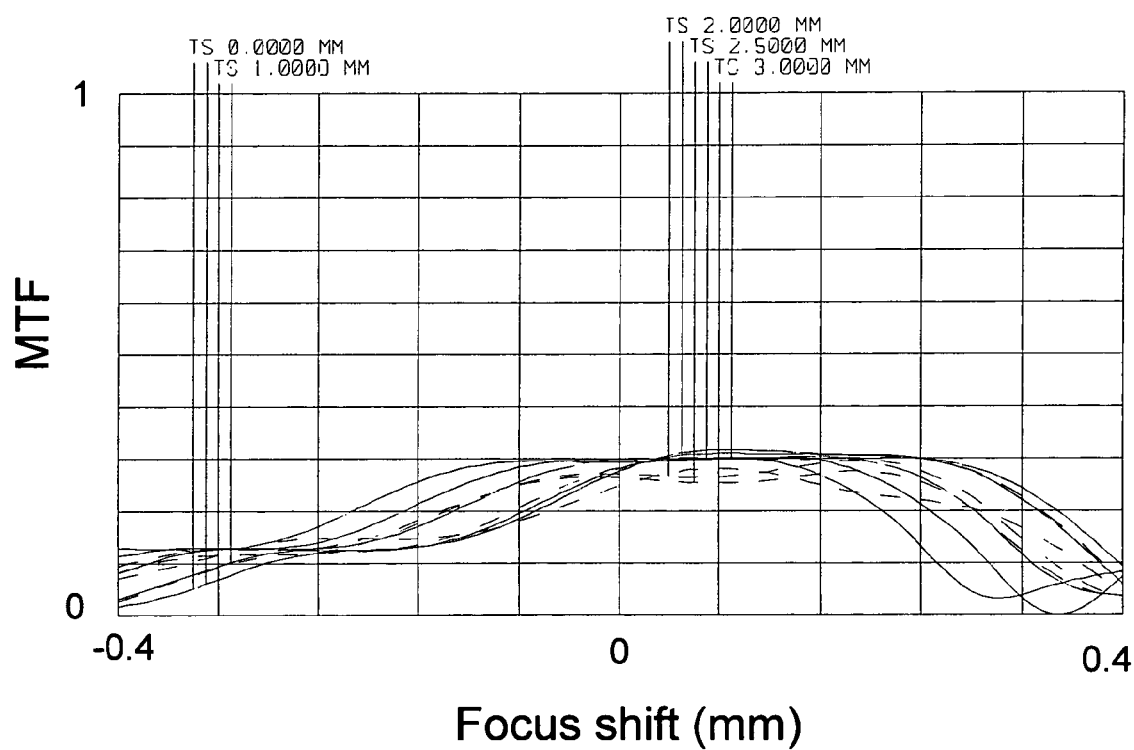
FIG. 3 is a plot of the through-focus MTF for five different fields.

FIG. 3 plots the through-focus MTF at a spatial frequency of 33 lp/mm for Example 3 as delivered by the optical system 20 with "white light" covering the entire visible spectrum.

FIGS. 4A and 4B, FIGS. 5A and 5B and FIGS. 6A and 6B plot typical three example gain functions and their corresponding polychromatic processed (output) MTF' obtained using the above-described process. The MTF gain function is simplified as a frequency function composed of the product of a parabolic function multiplied by a hypergaussian function, namely:

$$\text{Gain} = (1 + A \cdot f^2) \cdot e^{-\left(\frac{f^2}{f_0^2}\right)^n}$$

Here, A is a constant, n is the hypergaussian order, and $f_0$ is the cutoff frequency, which is set at the highest frequency where the raw MTF is recommended to be higher that 5% on the whole range of the extended depth of field DOF. The parameters A, $f_0$ and n allows for changing the output MTF' level and managing the cut off frequency depending of the Nyquist frequency $f_N$ of the image sensor. Reducing the MTF at the Nyquist frequency $f_N$ reduces the noise level and avoids aliasing artifacts in the image.

Figure 4A:
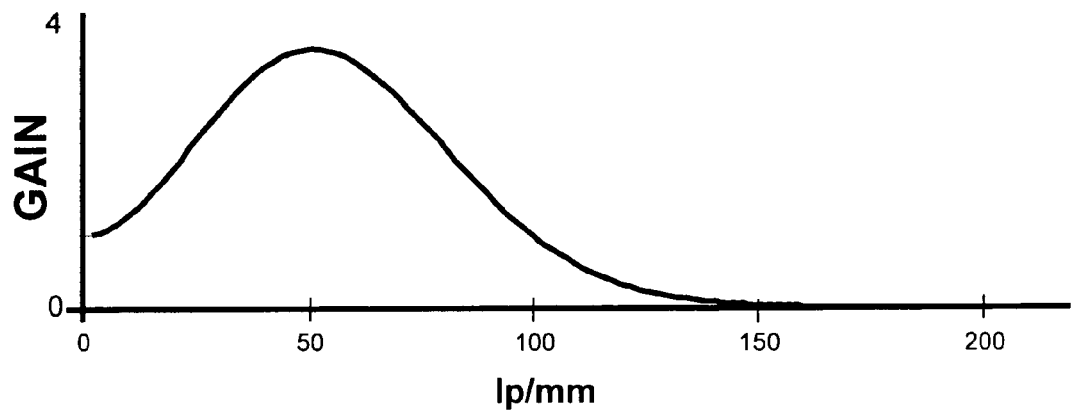
FIG. 4A and FIG. 4B are plots of the gain curve and the corresponding polychromatic MTF curves, respectively, for a first example gain curve, with the curves in FIG. 4B representing different focus positions from −0.04 mm to 0.08 mm in increments of 0.01 mm.
Figure 4B:
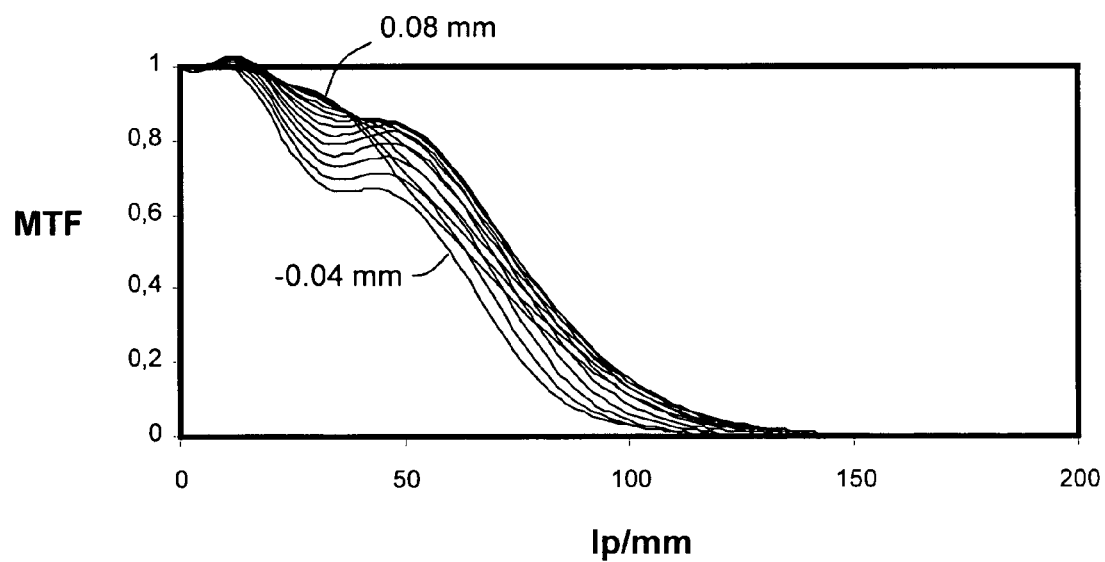
Figure 5A:
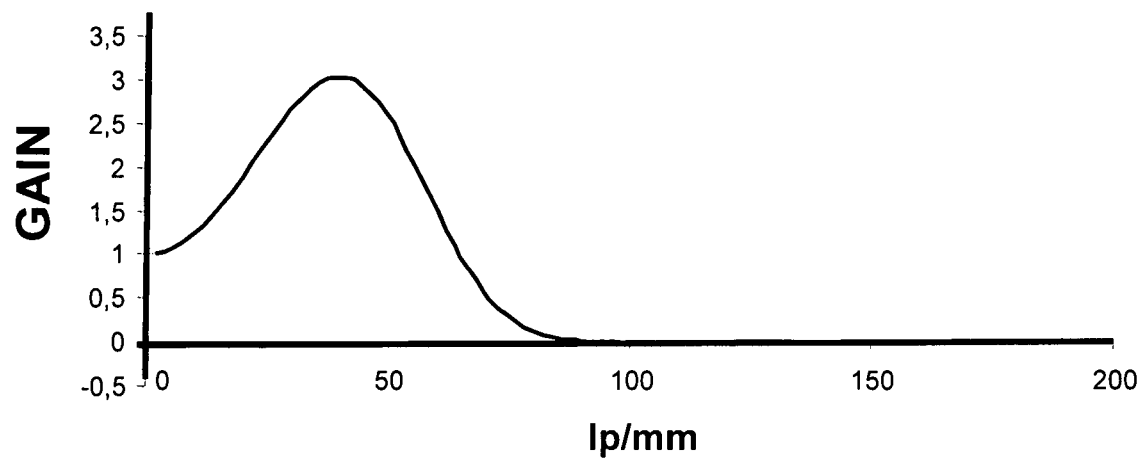
FIG. 5A and FIG. 5B are plots similar to FIGS. 4A and 4B of the gain curve and the corresponding polychromatic MTF curves, respectively, for a second example gain curve.
Figure 5B:
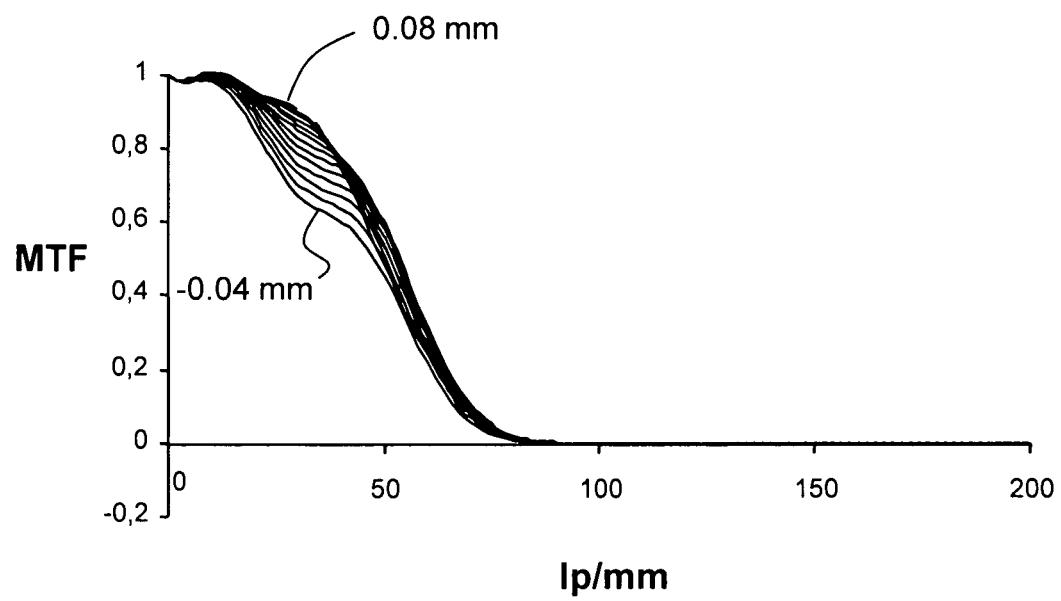
Figure 6A:
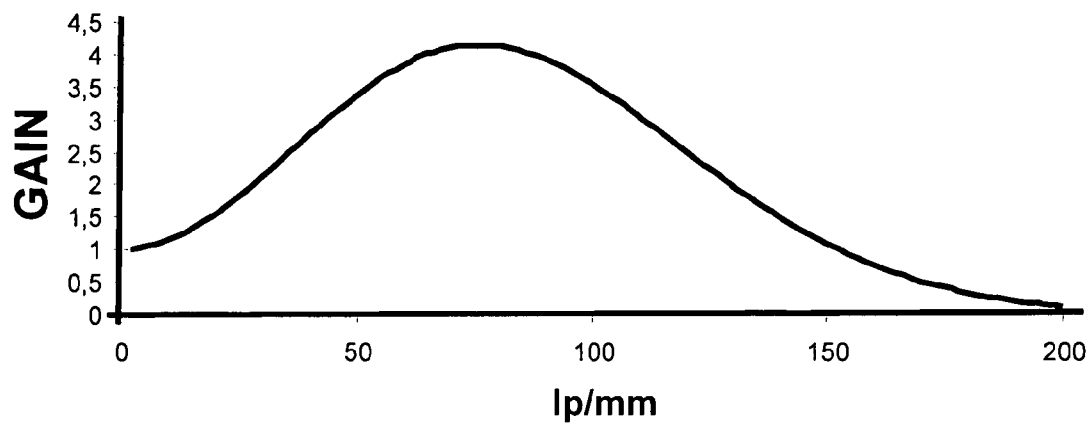
FIG. 6A and FIG. 6B are plots similar to FIGS. 4A and 4B of the gain curve and the corresponding polychromatic MTF curves, respectively, for a third example gain curve.
Figure 6B:
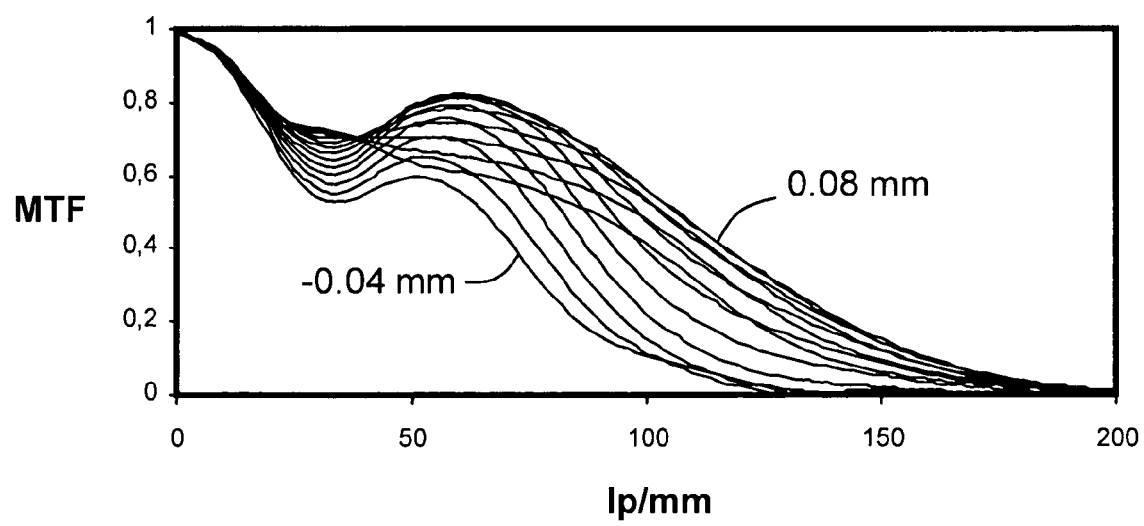

In FIG. 4A, the gain function has A=0.003. $f_0$=54 and n=1. In FIG. 5A, the gain function has A=0.0024. $f_0$=50 and n=1.7. In FIG. 6A, the gain function has A=0.0016. $f_0$=80 and n=1.

Figure 7A:
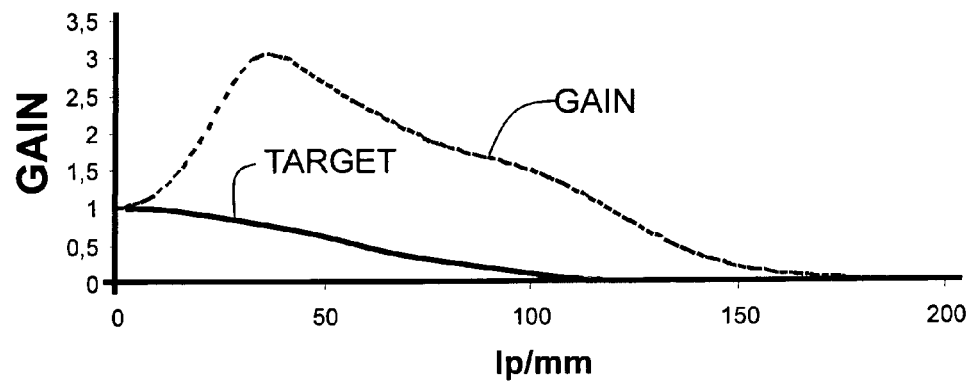
FIG. 7A is a plot of an example gain curve and a target MT, and FIG. 7B plots the raw and processed MTF for different focus positions as in FIG. 4B based on the gain curve of FIG. 7A.
Figure 7B:
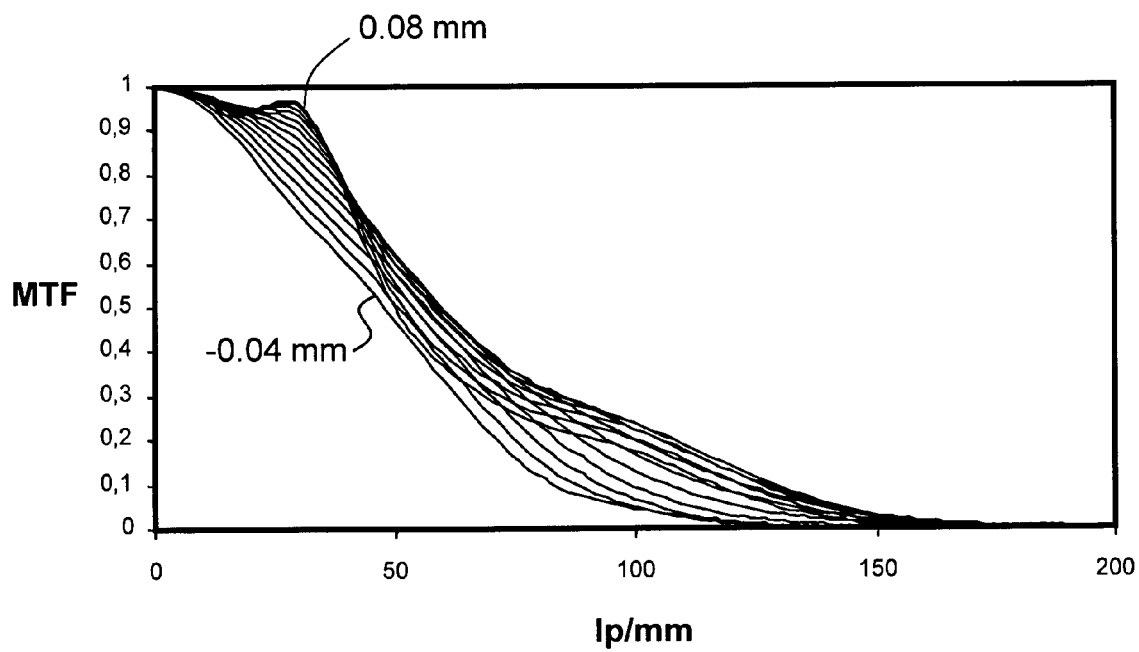

FIG. 7A is a plot of an example gain curve and the output MTF' and FIG. 7B plots the raw and processed MTFs for different focus positions based on the gain curve of FIG. 7A. In FIG. 7A, the shape of the output MTF' is as close as possible to the hypergaussian function, namely:

$$\text{Gain}(f) = \frac{e^{-\left(\frac{f^2}{f_0^2}\right)^n}}{MTF_{Z=0}(f)}$$

In this way, the gain function is adapted to produce the hypergaussian output MTF' as described after the digital process. The raw MTF multiplied by the gain function produces the hypergaussian output MTF'.

The output MTF' is represented by a hypergaussian. The hypergaussian output MTF' has some valuable properties of producing a high contrast at low and medium spatial frequencies up to the half cut off frequency and then produces a continuous and regular drop that minimize overshoot and ringing on the processed PSF, LSF (Line Spread Function) and ESF (Edge Spread Function).

If n=1, the output MTF' is Gaussian. This provides a PSF, LSF and ESF without any ringing or overshoot. If n>1, the output MTF' is a hypergaussian. For higher values of n, the contrast at high spatial frequencies is also high, but ringing and overshoot increases. A good compromise is 1>n>2, wherein the output MTF' is well enhanced at low and medium spatial frequencies, while the ringing and overshoot are limited to about 5%, which is acceptable for most imaging applications. In an example embodiment, the real output MTF' is as close as possible to a hypergaussian.

It is important to control the power noise amplification. At distances where the gain on the raw MTF is higher in order to achieve the output MTF', a good compromise between the MTF level and the signal-to-noise ratio on the image can be determined, while controlling the slope of the output MTF' at high special frequencies avoids significant overshoot.

In the MTF plots of FIG. 7B, the output MTF' has a smooth shape that avoids overshoots and other imaging artifacts. The applied gain of the digital filter is optimized or enhanced to obtain the maximum output MTF' while controlling the gain or noise.

Image Noise Reduction by Averaging Sequential Images

There are two distinct sources of noise associated with the image acquisition and image processing steps. The first source of noise is called "fixed-pattern noise" or FP noise for short. The FP noise is reduced by a specific calibration of image sensor 30 at the given operating conditions. In an example embodiment, FP noise is reduced via a multi-level mapping of the fixed pattern noise wherein each pixel is corrected by a calibration table, e.g., a lookup table that has the correction values. This requires an individual calibration of each image sensor and calibration data storage in a calibration file. The mapping of the fixed pattern noise for a given image sensor is performed, for example, by imaging a pure white image (e.g., from an integrating sphere) and measuring the variation in the acquired raw digital image.

The other source of noise is shot noise, which is random noise. The shot noise is produced in electronic devices by the Poisson statistics associated with the movement of electrons. Shot noise also arises when converting photons to electrons via the photo-electric effect.

Some imaging applications, such as iris recognition, require a high-definition image sensor 30. To this end, in an example embodiment, image sensor 30 is or includes a CMOS or CCD camera having an array of 3000×2208 pixels with a pixel size of 3.5 μm. The full well capacity is reduced to 21,000 electrons for a CMOS camera at this small pixel size, and the associated minimum of shot noise is about 43.2 dB at the saturation level.

An example embodiment of system 10 has reduced noise so that the MTF quality is improved, which leads to improved images. The random nature of the shot noise is such that averaging N captured images is the only available approach to reducing the noise (i.e., improving the SNR). The noise decreases (i.e., the SNR increases) in proportion to $N^{1/2}$. This averaging process can be applied to raw images as well as to processed (i.e., contrast-enhanced) images.

Averaging N captured images is a suitable noise reduction approach so long as the images being averaged are of a fixed object or scene. However, such averaging is problematic when the object moves. In an example embodiment, the movement of object OB is tracked and accurately measured, and the averaging process for reducing noise is employed by accounting for and compensating for the objection motion prior to averaging the raw images.

In an example embodiment, the image averaging process of the present disclosure uses a correlation function between the sequential images at a common region of interest. The relative two-dimensional image shifts are determined by the location of the correlation peak. The correlation function is processed in the Fourier domain to speed the calculation by using a fast-Fourier transform (FFT) algorithm. The correlation function provided is sampled at the same sampling intervals as the initial images. The detection of the correlation maximum is accurate to the size of one pixel.

An improvement of this measurement technique is to use a 3×3 kernel of pixels centered on the pixel associated with the maximum correlation peak. The sub-pixel location is determined by fitting to two-dimensional parabolic functions to establish a maximum. The (X,Y) image shift is then determined. The images are re-sampled at their shifted locations. If the decimal part of the measured (X,Y) shift is not equal to 0, a bi-linear interpolation is performed. It is also possible to use a Shannon interpolation as well because there is no signal in the image at frequencies higher than the Nyquist frequency. All the images are then summed after being re-sampled, taking in account the (X,Y) shift in the measured correlation.

Optical System

As discussed above, imaging optical system 20 has a depth of field DOF in object space OS and a depth of focus DOF' in image space IS as defined by the particular design of the optical system. The depth of field DOF and the depth of focus DOF' for conventional optical imaging systems can be ascertained by measuring the evolution of the Point Spread Function (PSF) through focus, and can be established by specifying an amount of loss in resolution R that is deemed acceptable for a given application. The "circle of least confusion" is often taken as the parameter that defines the limit of the depth of focus DOF'.

In the present disclosure, both the depth of field DOF and the depth of focus DOF' are extended by providing optical system 20 with an amount of spherical aberration (SA). In an example embodiment, $0.2\lambda \leq SA \leq 5\lambda$, more preferably $0.2\lambda \leq SA \leq 2\lambda$ and even more preferably $0.5\lambda \leq SA \leq 1\lambda$, where $\lambda$ is an imaging wavelength. In an example embodiment, the amount of spherical aberration SA in the optical system at the imaging wavelength $\lambda$ is such that the depth of field DOF or the depth of focus DOF' increases by an amount between 50% and 500% as compared to a diffraction limited optical system. By adding select amounts of spherical aberration SA, the amount of increase in the depth of field DOF can be controlled. The example optical system designs set forth below add select amounts of spherical aberration SA to increase the depth of field DOF without substantially increasing the adverse impact of other aberrations on image formation.

Since the depth of field DOF and the depth of focus DOF' are related by the axial magnification $M_A$ and lateral magnification $M_L$ of optical system 20 via the relationships DOF'= $(M_A)$ DOF=$(M_L)^2$DOF, system 10 is said to have an "extended depth of field" for the sake of convenience. One skilled in the art will recognize that this expression also implies that system 10 has an "extended depth of focus" as well. Thus, either the depth of field DOF or the depth of focus DOF' is referred to below, depending on the context of the discussion.

The MTF can also be used in conjunction with the PSF to characterize the depth of focus DOF' by examining the resolution R and image contrast CI of the image through focus. Here, the image contrast is given by $$CI=(I_{MAX}-I_{MIN})/(I_{MAX}-I_{MIN})$$

and is measured for an image of a set of sinusoidal line-space pairs having a particular spatial frequency, where $I_{MAX}$ and $I_{MIN}$ are the maximum and minimum image intensities, respectively. The "best focus" is defined as the image position where the MTF is maximized and where the PSF is the narrowest. When an optical system is free from aberrations (i.e., is diffraction limited), the best focus based on the MTF coincides with the best focus based on the PSF. However, when aberrations are present in an optical system, the best focus positions based on the MTF and PSF can differ.

Conventional lens design principles call for designing an optical system in a manner that seeks to eliminate all aberrations, or to at least balance them to minimize their effect so that the optical system on the whole is substantially free of aberrations.

However, in the present disclosure, optical system 20 is intentionally designed to have spherical aberration as a dominant aberration, and optionally has a small amount of chromatic aberration as well. The spherical aberration reduces the contrast of the image by reducing the overall level of the MTF from the base frequency $f_0=0$ to the cutoff frequency $f_C$. The cut off frequency $f_C$ is not significantly reduced as compared to the ideal (i.e., diffraction-limited) MTF, so nearly all the original spatial-frequency spectrum is available. Thus, the spatial-frequency information is still available in the image, albeit with a lower contrast. The reduced contrast is then restored by the digital filtering process as carried out by image processing unit 54, as described above.

The amount of spherical aberration SA increases the depth of focus DOF' in the sense that the high spatial frequencies stay available over a greater range of defocus. The digital filtering restores the contrast over the enhanced depth of focus DOF', thereby effectively enhancing the imaging performance of optical system 20.

Spherical aberration is an "even" aberration in the sense that the wavefront "error" is an even power of the normalized pupil coordinate p. Thus, spherical aberration presents a rotationally symmetric wavefront so that the phase is zero. This means that the resulting Optical Transfer Function (OTF) (which is the Fourier Transform of the PSF) is a rotationally symmetric, real function. The MTF, which is the magnitude of the OTF, can be obtained where spherical aberration is the dominant aberration by considering a one-dimensional MTF measurement taken on a slanted edge. This measurement provides all the required information to restore the two-dimensional image via digital signal processing. Also, the phase is zero at any defocus position, which allows for digital image processing to enhance the MTF without the need to consider the phase component (i.e., the phase transfer function, or PFT) of the OTF in the Fourier (i.e., spatial-frequency) space.

An amount of spherical aberration SA of about $0.75\lambda$ gives a significant DOF enhancement without forming a zero in the MTF on one defocus side. Beyond about SA=$0.75\lambda$, a zero occurs on both sides of defocus from the best focus position. For a diffraction-limited optical system, the depth of focus DOF' is given by the relationship DOF'=$\pm\lambda/(NA^2)$, where NA is the numerical aperture of the optical system. In an example embodiment, optical system 20 has an NA between about 0.033 and 0.125 (i.e., about F/15 to about F/4, where F/#=1/(2NA) assuming the small-angle approximation).

By way of example, for F/6.6, a center wavelength of $\lambda$=800 nm and a bandwidth of $\Delta\lambda$, the diffraction-limited depth of focus DOF' is about 20 mm, with a transverse magnification of 1/1.4. The introduction of an amount of spherical aberration SA=0.75% increases the depth of focus DOF' to about 100 mm, an increase of about 5×.

Example Optical Systems with a Thick Single Lens

One major design issue with a single-lens optical system 20 is that control of field curvature becomes problematic. This limits the field size or requires the use of a field lens at the image plane to correct the field curvature, which is often impractical because there are filters or windows close to image plane.

Figure 8:
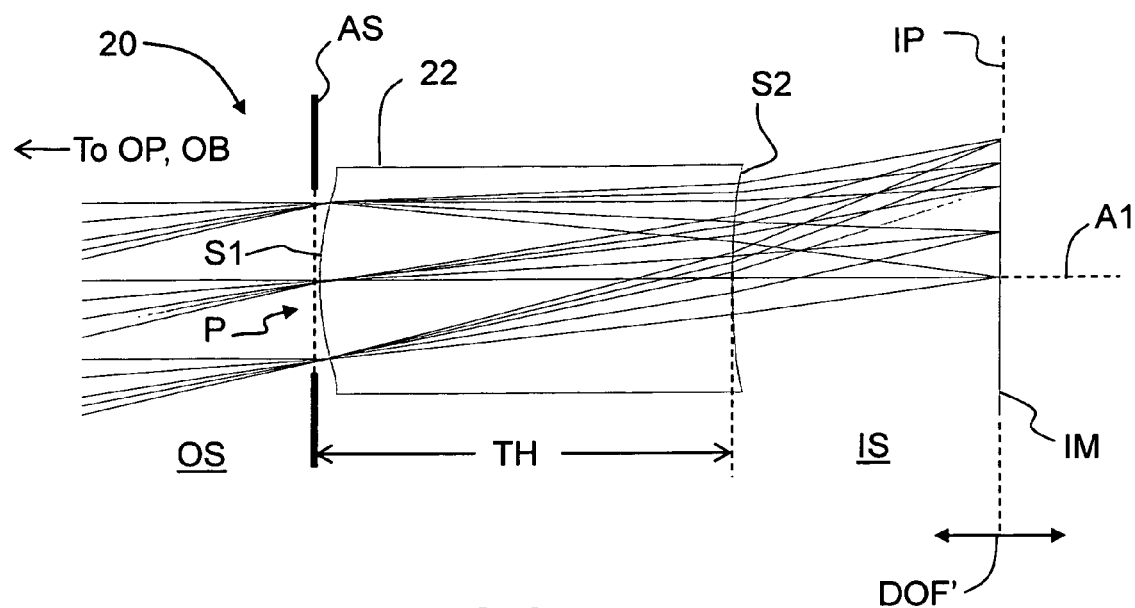
FIG. 8 is a schematic side view of an example embodiment of a single-lens optical system according to the present disclosure, where the optical system includes a thick single lens element.

FIG. 8 is a schematic side view of an example embodiment of a single-lens optical system 20 according to the present disclosure. Single lens element 22 of optical system 20 is relatively thick and uses a single optical material (e.g., flint glass, an acrylic a plastic, or fused silica) having a relatively low refractive index to facilitate field curvature correction. An example optical system 20 has a field size of 6 mm so that the optical system can be used with an image sensor 30 (see FIG. 1) having a size of ⅓ inch (diagonal measure).

Figure 9:
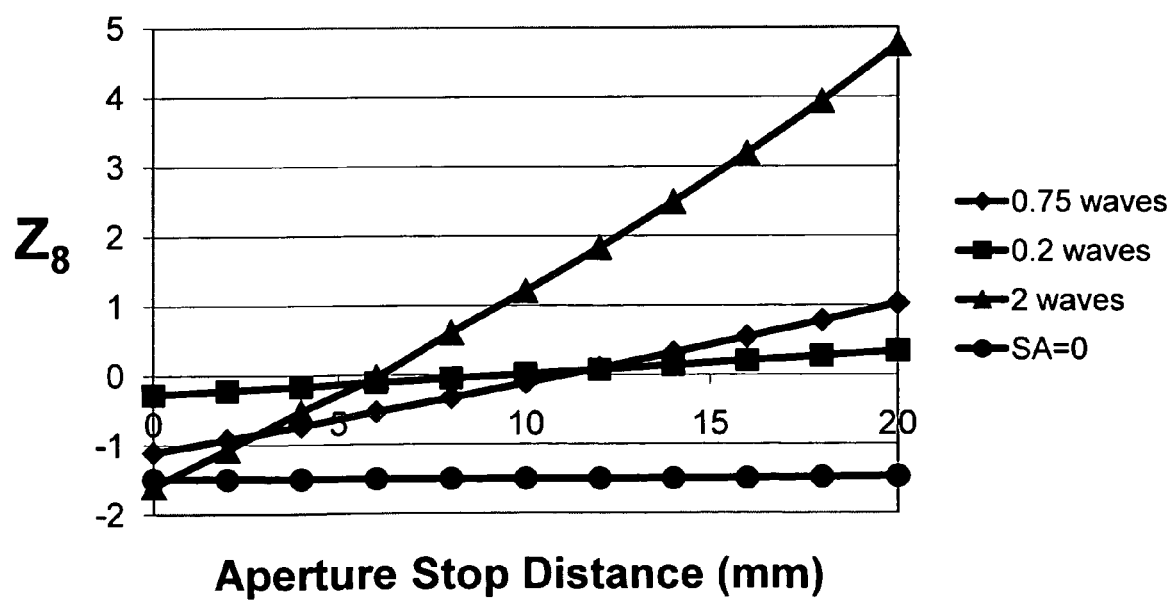
FIG. 9 plots the amount of coma (Zernike coefficient $Z_8$) versus aperture stop objectwise distance from the front surface of the single lens for various amounts of spherical aberration.

With reference to FIG. 9, control of coma (i.e., reduction or elimination) is accomplished by optical system 20 having a select amount of spherical aberration SA and then arranging aperture stop AS at a position relative to lens 22 (i.e., an objectwise distance DS from front surface S1) where coma is reduced or eliminated. The presence of spherical aberration SA allows for a substantially constant wavefront, PSF or MTF across the field by removing coma. In an example, correction of field curvature and astigmatism is accomplished using surface S2. The loss of MTF produced by the SA can be compensated by the signal processing techniques described above when the raw image does not have high enough contrast.

With reference again to FIG. 8, optical system 20 consists of single lens element 22 arranged along optical axis A1, and aperture stop AS arranged objectwise of the single lens element. Lens element 20 has a front (i.e., objectwise) surface S1 and a rear (i.e., imagewise) surface S2, and a center (axial)

thickness TH. Aperture stop AS is arranged along optical axis A1 and defines a pupil P having a radial coordinate ρ. Pupil P also defines the optical system's entrance and exit pupils as viewed from the object and image spaces, respectively. In a preferred embodiment, aperture stop AS is located in object space OB, i.e., anywhere between the object OB and first surface S1.

Figure 10:
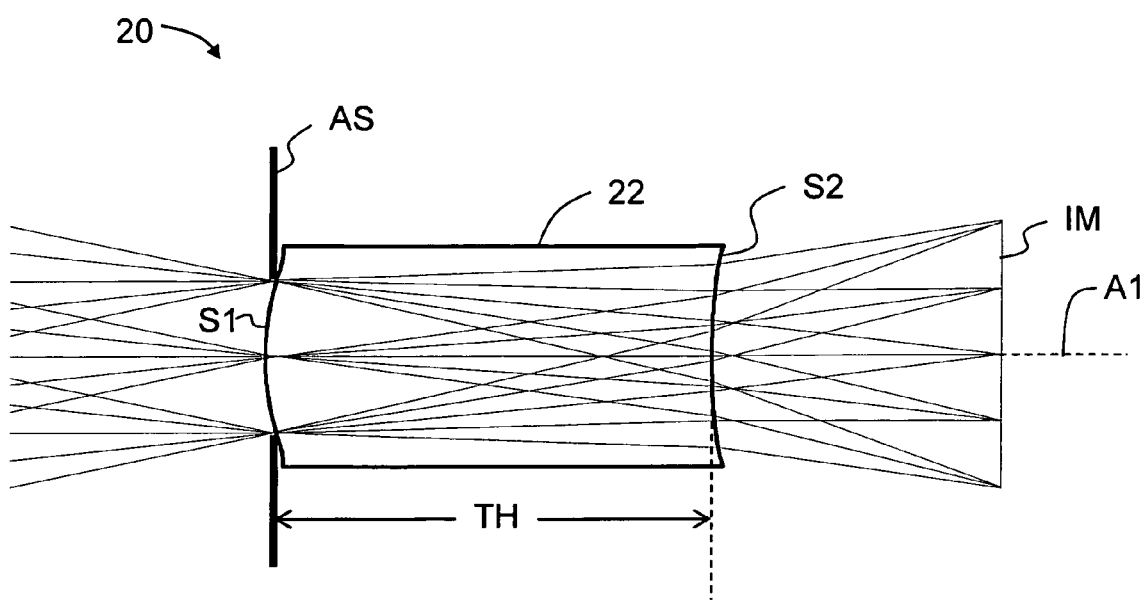
FIG. 10 is similar to FIG. 8 and illustrates an example embodiment of the single-lens optical system according to Example 3.
Figure 11A:
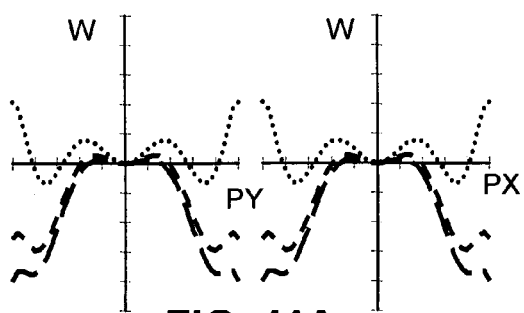
FIGS. 11A through 11D are wavefront plots for field positions of 0 mm (on axis), 1 mm, 2 mm and 3 mm for the optical system of Example 3 for wavelengths of 500 nm, 600 nm and 670 nm represented by dotted, dashed and long-dashed lines, respectively, with the maximum wavefront scale being +/−2 waves.
Figure 11B:
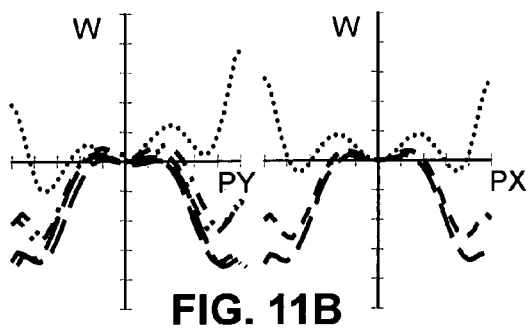
Figure 11C:
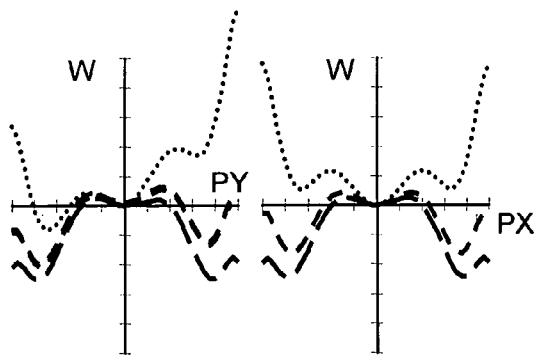
Figure 11D:
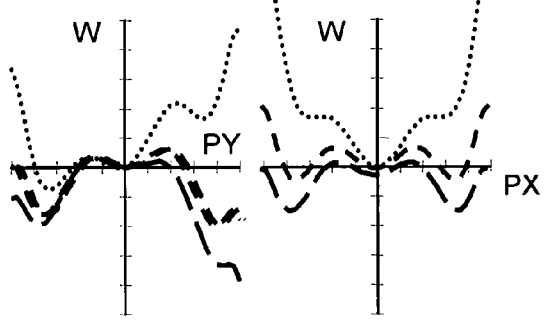
Figure 12A:
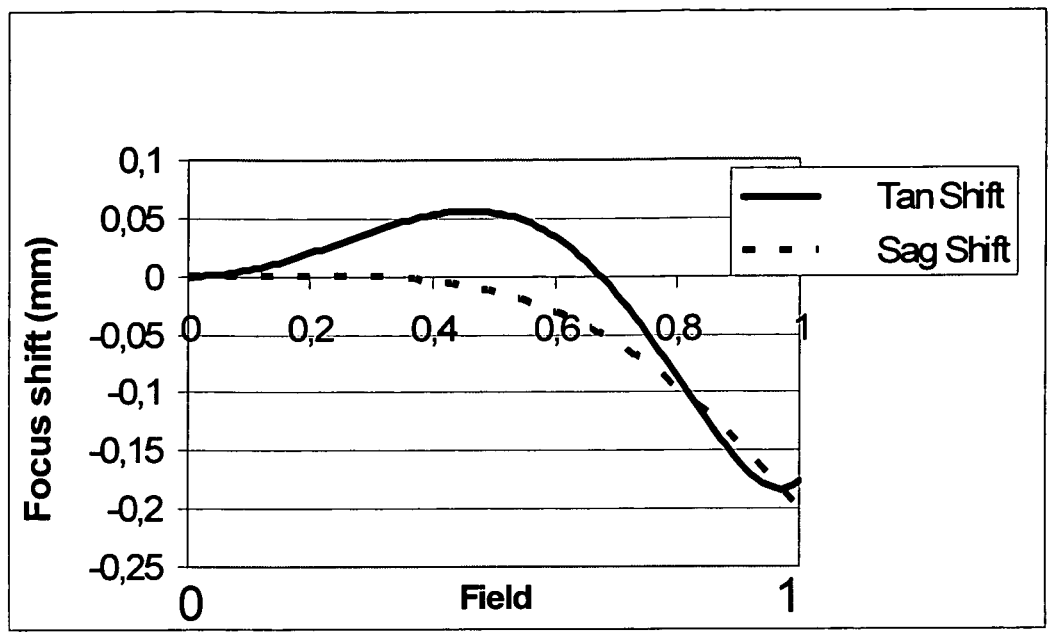
FIG. 12A through FIG. 12F plot the focus shift (mm) as a function of field position for sagittal and tangential planes that illustrate the field curvature for Examples 1 through 6, respectively FIG. 13 plots the through-focus MTF for both the diffraction-limited case and an example optical system of the present disclosure, with the plot taken at line a frequency of 33 mm$^{-1}$.
Figure 12B:
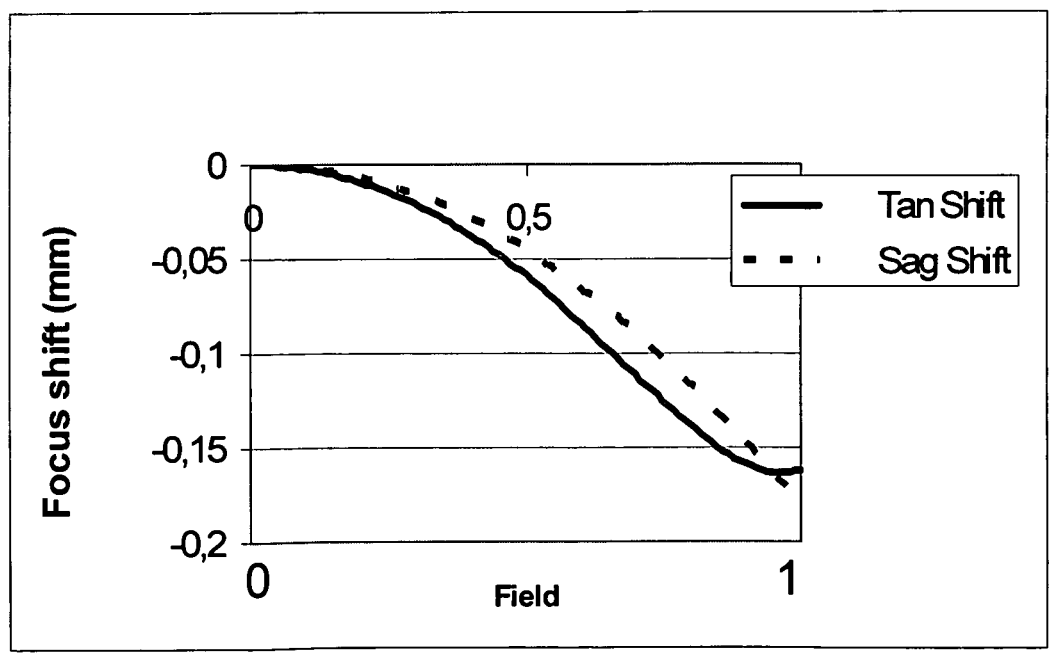
Figure 12C:
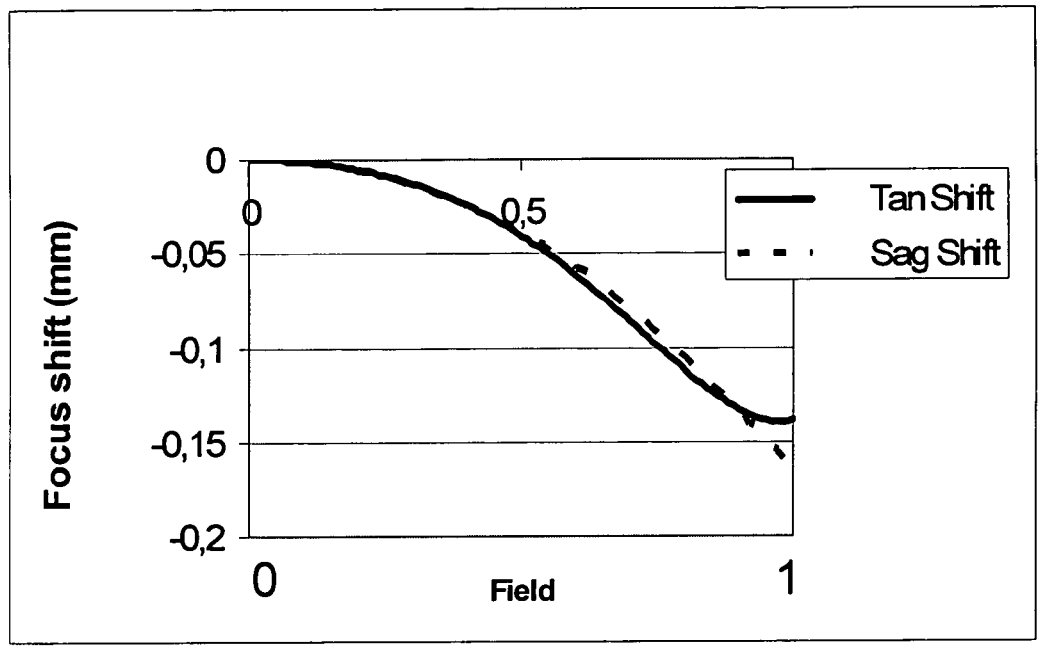
Figure 12D:
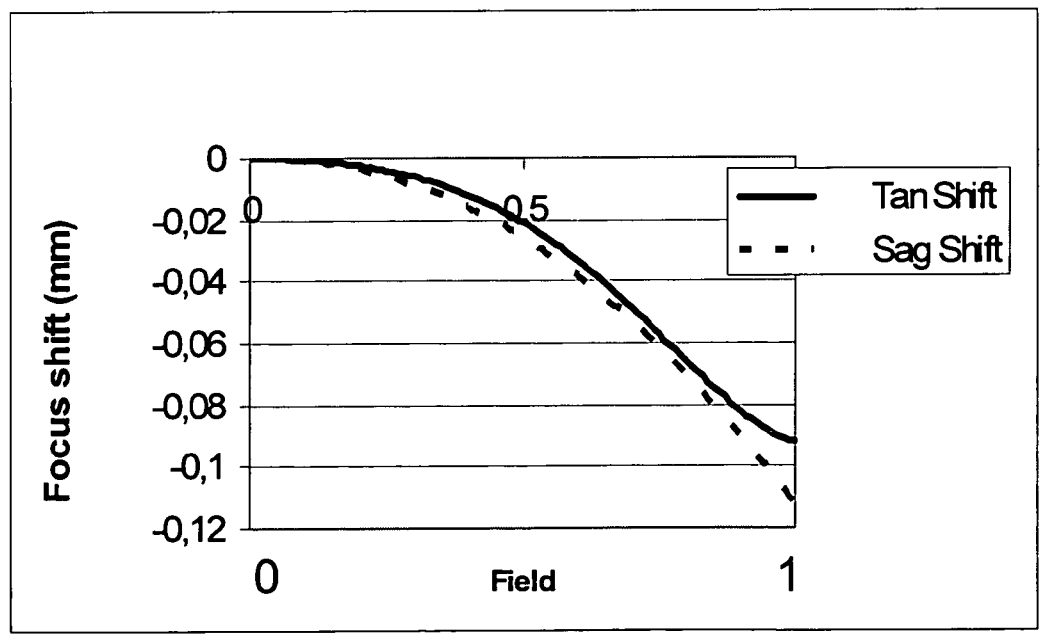
Figure 12E:
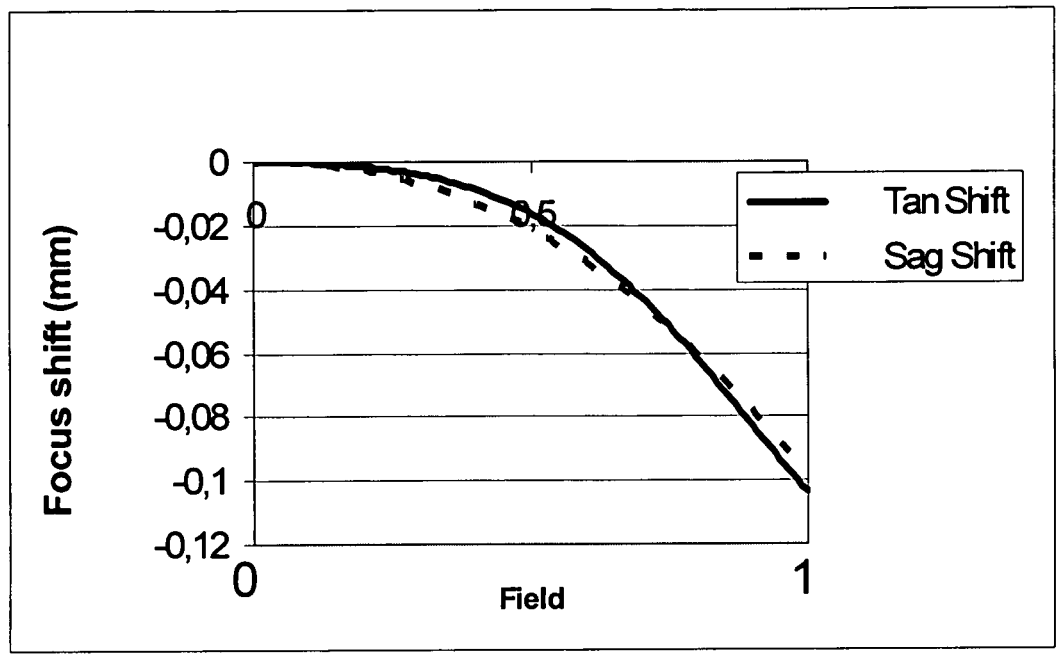
Figure 12F:
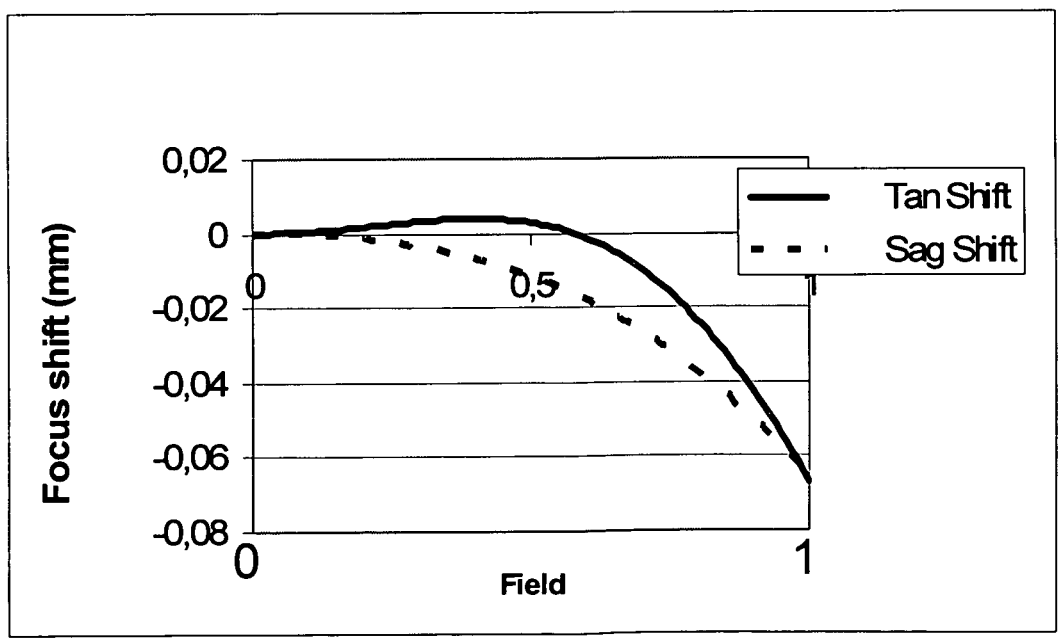

FIG. 10 is similar to FIG. 8 and illustrates an example embodiment of optical system 20 and single lens element 22 according to an Example 3, which is discussed in greater detail below. The material for lens element 22 is Poly(methyl methacrylate) (PMMA) having $n_d=1.4917$ and $v_d=57.44$. The focal length F=13.8 mm, the working aperture is F/4, the spectral range is 440 nm to 900 nm, and the field diameter is 6 mm.

In Example 3, the aperture stop AS is located at front surface S1, which makes optical system 20 very compact and also makes the integration of the aperture stop with lens 22 relatively easy. The lens thickness TH=10 mm. Surface S1 is convex and surface S2 is concave spherical.

The equation describing the sag of an aspheric optical surface is given by:

$$Z = \frac{cr^2}{1 + \sqrt{1-(1+k)c^2r^2}} + \sum_{2i} a_{2i} \cdot r^{2i}$$

where k is the conic constant, r is the radial coordinate, c is the curvature, and $\alpha_{2i}$ represents even aspheric coefficient for i=1, 2, 3 . . . .

Table 1 below sets forth the basic design parameters for six different examples of optical system 20 and lens 22. All dimensions are in millimeters. The glass type for each lens 22 is PMMA. R1 and R2 are the radii of curvature and D1 and D2 are the clear apertures for surfaces S1 and S2, respectively. Also, F is the focal length, F# is the F-number, TH is the axial thickness, TT is the "total track," which is axial thickness TH plus the back focal length. The FOV is the field of view, which is based on a ⅓" (6 mm) diagonal image sensor.

| EX | F | F# | R1 | D1 | R2 | D2 | TH | TT | FOV |
|---|---|---|---|---|---|---|---|---|---|
| 1 | 8 | 3 | 3.63078 | 4 | 15.1124 | 4 | 5.86227 | 10.1 | 35° |
| 2 | 10 | 3.5 | 3.90152 | 2.9325 | 8.48846 | 3.4578 | 6.27058 | 11.5 | 29.4° |
| 3 | 13.8 | 4 | 5.95515 | 5 | 22.2518 | 5 | 10.000 | 16.6 | 23.5° |
| 4 | 18.0 | 4 | 7.44677 | 4.6 | 20.2923 | 4.6 | 12.2306 | 20.7 | 18.25° |
| 5 | 25 | 4 | 11.3295 | 5.7 | 58.2961 | 6.4 | 18.7723 | 30.36 | 13.4° |
| 6 | 36 | 4 | 18.3531 | 7.51 | 320.756 | 9.26 | 29.6531 | 46.8 | 9.3° |

Table 2 sets forth the aspheric coefficients for surfaces S1 and S2 for the above examples.

TABLE 2

ASPHERIC COEFFICENTS FOR EXAMPLES 1-6

| EX | S1, S2 | $a_4$ | $a_6$ | $a_8$ | $a_{10}$ |
|---|---|---|---|---|---|
| 1 | S1 | 0 | −0.021165631 | −.012681553 | 0.002521543 |
|   | S2 | 0.014224929 | 0.0028920026 | 0.00063565899 | $-2.1174244 \times 10^{-5}$ |
| 2 | S1 | 0 | 0.0080693467 | −0.0020410138 | 0 |
|   | S2 | 0.0068889874 | $4.77189 \times 10^{-5}$ | $6.22173 \times 10^{-5}$ | 0 |
| 3 | S1 | 0 | 0.00182174 | −0.000314408 | 0 |
|   | S2 | 0.00205553 | $-6.5086 \times 10^{-5}$ | $2.38613 \times 10^{-5}$ | 0 |
| 4 | S1 | 0 | 0.00027556 | $-2.5834 \times 10^{-5}$ | 0 |
|   | S2 | 0.0011578 | $-4.06548 \times 10^{-5}$ | $1.08366 \times 10^{-5}$ | 0 |
| 5 | S1 | 0 | $3.991 \times 10^{-5}$ | $-1.9259 \times 10^{-6}$ | 0 |
|   | S2 | 0.0003166 | $-1.5053 \times 10^{-5}$ | $2.08375 \times 10^{-6}$ | 0 |
| 6 | S1 | 0 | $3.991 \times 10^{-5}$ | $-1.926 \times 10^{-6}$ | 0 |
|   | S2 | 0.0003166 | $-1.5053 \times 10^{-5}$ | $2.08375 \times 10^{-6}$ | 0 |

Table 3 below sets forth Zernike polynomials for third-order and higher-order spherical aberration, and Table 4 below sets forth the Zernike coefficients for each of Examples 1 through 6 for on-axis and at 600 nm. The coordinate ρ is the normalized radius on the pupil 0<ρ<1. The term Z9 is the third-order spherical aberration term, Z16 the fifth-order term, etc. Note that en in Table 3 is shorthand notation for $x^n$.

TABLE 3

ZERNIKE POLYNOMIALS FOR SPHERICAL ABERRATION

| | |
|---|---|
| Z9 | $(6\rho^4 - 6\rho^2 + 1)$ |
| Z16 | $(20\rho^6 - 30\rho^4 + 12\rho^2 - 1)$ |
| Z25 | $(70\rho^8 - 140\rho^6 + 90\rho^4 - 20\rho^2 + 1)$ |
| Z36 | $(252\rho^{10} - 630\rho^8 + 560\rho^6 - 210\rho^4 + 30\rho^2 - 1)$ |
| Z37 | $(924\rho^{12} - 2772\rho^{10} + 3150\rho^8 - 1680\rho^6 + 420\rho^4 - 42\rho^2 + 1)$ |

TABLE 4

ZERNIKE POLYNOMIAL COEFFICIENTS FOR EXAMPLES 1-6

|     | EX 1     | EX 2        | EX 3        | EX 4        | EX 5        | EX 6        |
|-----|----------|-------------|-------------|-------------|-------------|-------------|
| Z9  | 0.205    | 0.49545386  | 0.50226159  | 0.49634080  | 0.50275199  | 0.50484587  |
| Z16 | 0.034    | 0.2088811   | 0.13286203  | 0.09612405  | 0.10575769  | 0.12702795  |
| Z25 | −0.153   | −0.49918268 | −0.29482884 | −0.22084578 | −0.22645594 | −0.25227367 |
| Z36 | 0.225    | 0.00873132  | 0.00222264  | 0.00104948  | −0.00003476 | 0.00070151  |
| Z37 | −0.00237 | −0.00009468 | −0.00004924 | 0.00001852  | 0.00006942  | 0.00002535  |

FIGS. 11A through 11D are wavefront plots for field positions of 0 mm (on axis), 1 mm, 2 mm and 3 mm for the optical system 20 of Example 3. The vertical scale is +/−2 waves (+/−2λ) maximum. Three different wavelengths of 500 nm, 600 nm and 670 nm are shown as dotted, dashed and long-dashed lines, respectively.

A characteristic of the wavefronts in FIGS. 11A through 11D is that they show both low-order and higher-order spherical aberration. The aspherization of first surface S1 produces the main wavefront, with the aspherization of this surface producing the higher-orders of spherical aberration. Since this surface can be at or very close to aperture stop AS (and thus the entrance pupil), the aspherized surface S1 works much like a phase object.

FIG. 12A through FIG. 12F plot the focus shift (mm) as a function of field position (normalized to 1 at the field edge) for sagittal and tangential planes that illustrate the field curvature for Examples 1 through 6, respectively. Because the field curvature includes higher-order terms, the amount of field curvature FC is defined herein as the greatest amount of defocus over the field relative to the on-axis field position. Said differently, field curvature FC is defined herein as the difference between the paraxial field curvature and the best-focus field curvature.

For the shortest focal length optical system 20, FC ~60 microns (Example 6) and for the longest focal length optical system, FC ~250 microns (Example 1). Example embodiments of optical system 20 have field curvature FC in the range 20 microns≦FC≦300 microns.

Figure 13:
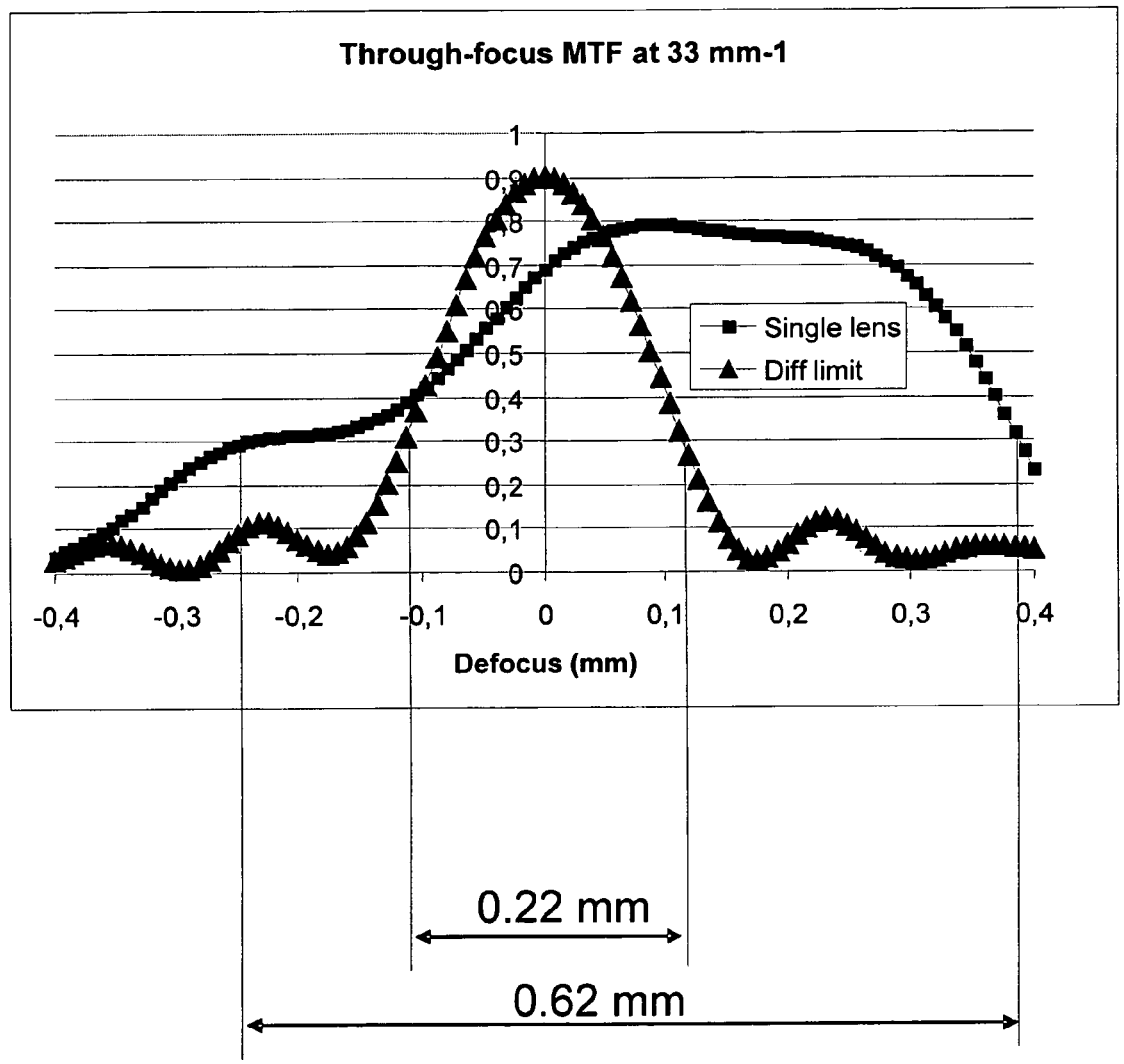

FIG. 13 plots the through-focus MTF for both the diffraction-limited case and the output MTF' for an example optical system 20 having spherical aberration. The plot is taken at a spatial frequency of 33 mm⁻¹. Optical system 20 has been boosted by a digital process with a 2.5 amplification ratio applied. The depth of focus increases from 0.22 mm to 0.62 mm, an increase of 2.8×.

Figure 14:
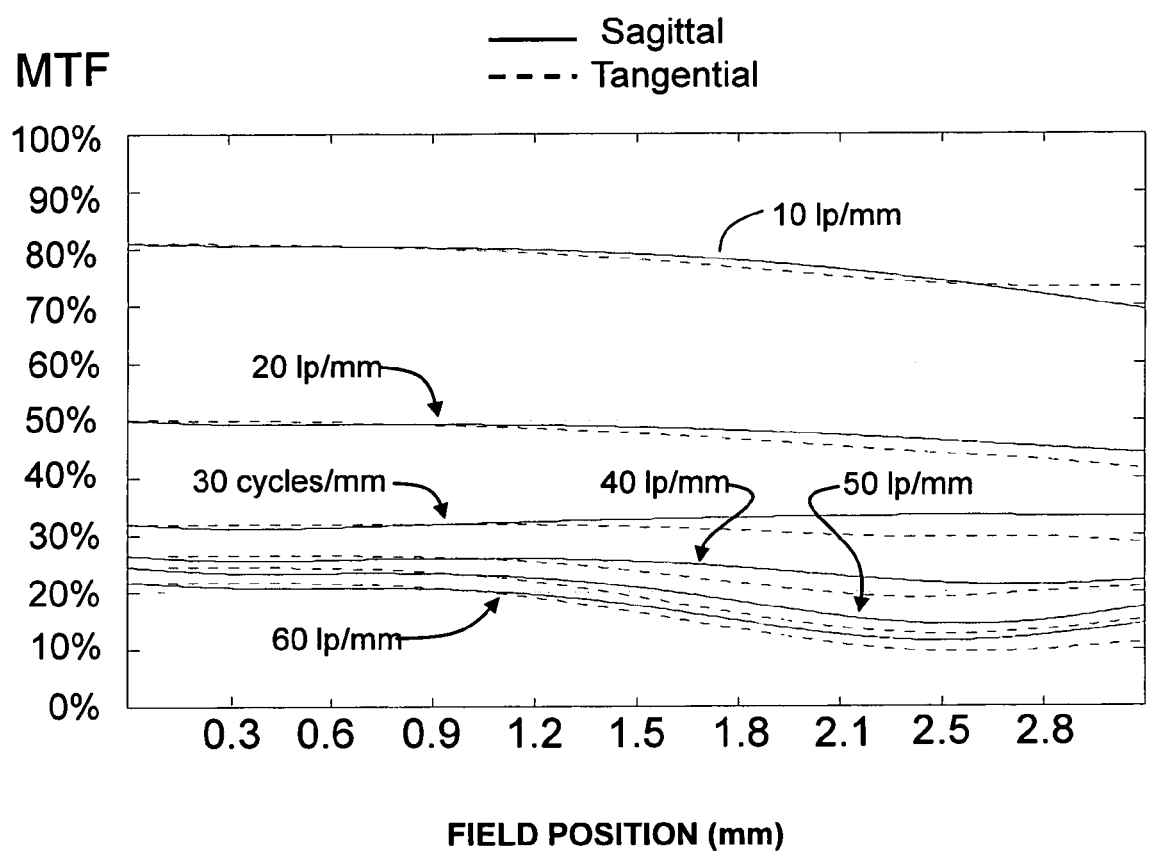
FIG. 14 is the MTF plot at 6 different spatial frequencies from 10 lp/mm to 60 lp/mm versus Field on a ⅓" image sensor size of the design Example 3 that shows the almost constant MTF over the field.

An important characteristic of the design of lens element 22 is that it provides an almost constant wavefront all over the field, thereby providing an almost constant PSF and MTF across the field. This is illustrated in FIG. 14, which plots the MTF vs. field position (mm) for a number of different spatial frequencies (from 10 lp/mm to 60 lp/mm) for sagittal and tangential planes. The inclusion of higher-order spherical aberration in optical system 20 allows for substantial enhancement of the optical system performance.

It is noted that a second parameter that has an influence on the depth of field determined by the through-focus MTF is chromatic aberration. A single positive lens element is not corrected of the chromatic aberration, the amount of which is related to the Abbe number of the optical material. In the present disclosure, a low-dispersion glass or plastic is used to minimize the loss of MTF produced by chromatic aberration.

The depth of field enhancement depends also on the required MTF or resolution expected for the application. For example, on a VGA camera that has 7.5 μm pixel size, the depth of field is measured at half the Nyquist spatial frequency $f_N$, i.e., $f_N/2=33$ mm⁻¹. The threshold of accepted MTF can thus be set at 30% contrast. In this case, the depth of field is the focus distance range that allows for the MTF>30%.

ADVANTAGES

The single-element lens design of optical system 20 of EDOF system 10 has a number of key advantages over prior art EDOF imaging systems. The first is that the design is simple and only uses one optical element to achieve the desired EDOF effect. The second is that the optical element is a standard rotationally symmetric singlet lens, as opposed to a more complicated phase plate. The third advantage is that configuring the optical system to have select amounts of spherical aberration gives rise to an axial "zero coma" position for the aperture stop so that comatic aberration can be substantially eliminated, with the result that the only significant aberration is spherical aberration uniform over the image field—which is what is required for the EDOF imaging. The fourth advantage is the low cost associated with a single-lens optical system—an advantage that cannot be overstated given that many applications of system 10 will be for compact devices such as CCTV cameras, hand-held devices such as cell phones, and like systems and devices that need to maintain their cost competitiveness.

It will thus be apparent to those skilled in the art that various modifications and variations can be made to the present disclosure without departing from the spirit and scope of the disclosure. Thus, it is intended that the present disclosure cover the modifications and variations of this disclosure provided they come within the scope of the appended claims and their equivalents.

What is claimed is:

1. An imaging system for imaging an object within an extended depth-of-field (EDOF) at an imaging wavelength λ, comprising:
   an optical system having an optical axis and consisting of a single lens element having a focal length F, an axial thickness TH wherein 0.25F≦TH≦1.2F, an amount of field curvature FC wherein 20 microns≦FC≦300 microns, an aperture stop arranged objectwise of the single lens element, and an amount of spherical aberration SA wherein 0.2λ≦SA≦2λ when forming an image of the object; and
   an image sensor arranged to receive the image and form therefrom a digitized electronic raw image.

2. The imaging system of claim 1, further comprising;
   an image processor electrically connected to the image sensor and adapted to receive and digitally filter the digitized electronic raw image to form a digitized contrast-enhanced image.

3. The system of claim 1, wherein 0.5λ≦SA≦1λ.

4. The system of claim 1, wherein the aperture stop is located at an axial position that substantially minimizes comatic aberration.

5. The system of claim 4, wherein the single lens element is made of PMMA, fused silica or flint glass.

6. The system of claim 1, wherein the single lens element has first and second surfaces, and wherein at least one of the first and second surfaces is aspheric.

7. The system of claim 1, wherein the single lens has an objectwise front surface and wherein the aperture stop is within a distance DS<0.5F from the front surface.

8. The system of claim 1, wherein:
the single lens has an objectwise front surface that is aspherical and convex and an imagewise back surface that is aspherical and concave.

9. The system of claim 1, wherein the single lens element is made of a material having an Abbe number $v_d$ at d-wavelength light in the range $80 \leq v_d \leq 30$.

10. The system of claim 1, wherein the amount of spherical aberration includes third-order spherical aberration and higher-order spherical aberration.

11. The system of claim 10, wherein the amount of spherical aberration is defined by a Zernike polynomial with a third-order coefficient between $0.2\lambda$ and $1\lambda$, a fifth-order coefficient between $0\lambda$ and $0.5\lambda$, and a seventh-order coefficient between $-1.5\lambda$, and $-0.1\lambda$.

12. The system of claim 10, wherein the third-order Zernike coefficient is between $0.2\lambda$ and $2\lambda$, the fifth-order Zernike coefficient is between $0\lambda$ and $-0.8\lambda$.

13. A method of forming an image of an object over an extended depth of field (EDOF) at an imaging wavelength $\lambda$, comprising:
forming a raw image of an object with an optical axis and consisting of a single lens element having a focal length F, an axial thickness TH wherein $0.25F \leq TH \leq 1.2F$, an amount of field curvature FC wherein 20 microns $\leq FC \leq 300$ microns, an aperture stop arranged objectwise of the single lens element, and an amount of spherical aberration SA wherein $0.2\lambda \leq SA \leq 2\lambda$ when forming the raw image of the object; and
using an image sensor, electronically capturing the raw image to form a digitized raw image.

14. The method of claim 13, further comprising:
digitally filtering the digitized raw image to form a contrast-enhanced image.

15. The method of claim 13, wherein the raw image has associated therewith a raw modulation transfer function (MTF), and further comprising:
establishing an amount of defocus in the digitized raw image based on a position of the object relative to the optical system;
forming an enhanced MTF from the raw MTF by multiplying the raw MTF by a gain function, wherein the enhanced MTF is a function of the amount of defocus; and
applying the enhanced MTF to the digitized raw image to obtain the contrast-enhanced image.

16. The method of claim 13, wherein the raw image has an associated raw MTF, and further comprising:
forming an enhanced MTF from the raw MTF by multiplying the raw MTF by a gain function, wherein the enhanced MTF is substantially constant as a function of focus position; and
applying the enhanced MTF to the digitized raw image to obtain the contrast-enhanced image of the object.

17. The method of claim 13, further comprising arranging the aperture stop at an axial position that substantially minimizes comatic aberration.

18. The method of claim 13, wherein the single lens has an objectwise front surface and further comprising arranging the aperture stop to be at a distance DS<0.5F from the front surface.

19. The method of claim 13, further comprising forming the single lens element from PMMA, flint glass or fused silica.

20. The method of claim 13, wherein the single lens has an objectwise front surface and an imagewise back surface, and further comprising forming the front surface to be aspherical and convex and forming the back surface to be aspherical and concave.

* * * * *